UNITED STATES PATENT OFFICE.

OSCAR GÜNTHER AND LEOPOLD HESSE, OF ELBERFELD, AND ARTHUR ZART, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

BLACK AZO DYE.

945,780.  Specification of Letters Patent.  Patented Jan. 11, 1910.

No Drawing.  Application filed August 4, 1909. Serial No. 511,139.

*To all whom it may concern:*

Be it known that we, OSCAR GÜNTHER and LEOPOLD HESSE, residing at Elberfeld, and ARTHUR ZART, residing at Vohwinkel, near Elberfeld, Germany, doctors of philosophy, chemists, citizens of the German Empire, have invented new and useful Improvements in New Azo Dyes, of which the following is a specification.

This invention relates to the preparation of new azo dyestuffs which are obtained by combining in acid solution the diazo compounds of ethers of 5-nitro-2-amino-phenol

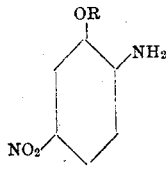

(R meaning a substituent such as $-CH_3$, $-C_2H_5$, $-C_6H_5$ etc.) or of their derivatives or substitution products with 2-arylamino-8-naphthol-6-sulfonic acids.

The new dyestuffs are after being dried and pulverized in the shape of their sodium salts dark powders soluble in water with a blackish color; yielding upon reduction with stannous chlorid and hydrochloric acid an ether of 1-oxy-2.5-phenylenediamin and 1-amino-2-arylamino-8-naphthol-6-sulfonic acid. They produce on wool from an acid bath very level bloomy black shades of good fastness to light and to milling.

In order to illustrate the new process more fully the following example is given, the parts being by weight: 168 parts of nitroaminoanisol ($NO_2 : NH_2 : OCH_3 = 5:2:1$) are dissolved by boiling in 1000 parts of a 20 per cent. hydrochloric acid and 700 parts of water. The solution is cooled to about 15° C. by the addition of ice and is then diazotized by means of 69 parts of sodium nitrite. After filtration sodium acetate is added to the diazo solution until it shows only a slightly acid reaction on Congo paper and it is then added at 5° C., while stirring, to an aqueous solution of 315 parts of 2-phenylamino-8-naphthol-6-sulfonic acid and 136 parts of crystallized sodium acetate which is cooled to 5° C. The combination is complete after a short time. The dyestuff is isolated in the usual way. It is after being dried and pulverized in the shape of its sodium salt a dark powder soluble in water with a black color and soluble in concentrated sulfuric acid with a dark blue color; yielding upon reduction with stannous chlorid and hydrochloric acid 1-methoxy-2.5-phenylene-diamin and 1-amino-2-phenylamino-8-naphthol-6-sulfonic acid; and dyeing wool from an acid bath a full black.

Similar shades are obtained on using instead of 2-phenylamino-8-naphthol-6-sulfonic acid, other of the above mentioned derivatives of 2-amino-8-naphthol-6-sulfonic acid e. g. paratolyl-, xylyl-, paraanisidyl-, metacarboxyphenyl-2-amino-8-naphthol-6-sulfonic acid or on using instead of the above mentioned diazo compound, diazo compounds of other 5-nitro-2-aminophenol ethers, e. g. of 5-nitro-4-chloro-2-aminoanisol, 5-nitro-4-methyl-2-aminoanisol, 5-nitro-2-aminophenetol, the benzyl- or phenylether of 5-nitro-2-aminophenol, etc.

We claim:

1. The herein described new azo dyestuffs obtainable from ethers of 5-nitro-2-aminophenol and 2-arylamino-8-naphthol-6-sulfonic acids, which are after being dried and pulverized in the shape of their sodium salts dark powders soluble in water with a blackish color; yielding upon reduction with stannous chlorid and hydrochloric acid an ether of 1-oxy-2.5-phenylenediamin and 1-amino-2-arylamino-8-naphthol-6-sulfonic acid; and dyeing wool black shades, substantially as described.

2. The herein described new azo dyestuff obtainable from nitro-aminoanisol ($NO_2 : NH_2 : OCH_3 = 5:2:1$) and 2-phenylamino-8-naphthol-6-sulfonic acid, which dye is after being dried and pulverized in the shape of its sodium salt a dark powder soluble in water with a black color and soluble in concentrated sulfuric acid with a dark blue color; yielding upon reduction with stannous chlorid and hydrochloric acid 1-methoxy-2.5-phenylenediamin and 1-amino-2-phenylamino-8-naphthol-6-sulfonic acid; and dyeing wool black shades, substantially as described.

In testimony whereof we have hereunto set our hands in the presence of two subscribing witnesses.

OSCAR GÜNTHER. [L. S.]
LEOPOLD HESSE. [L. S.]
ARTHUR ZART. [L. S.]

Witnesses:
 OTTO KÖNIG,
 PAUL MÜLLER.